United States Patent [19]

Gebhart et al.

[11] 4,010,221
[45] Mar. 1, 1977

[54] POLYVINYL CHLORIDE/COPOLYESTER COMPOSITIONS

[75] Inventors: Charles J. Gebhart, Akron; Clyde E. Gleim, Bath; Maria V. Wiener, Akron, all of Ohio

[73] Assignee: The Goodyear Tire & Rubber Company, Akron, Ohio

[22] Filed: Nov. 29, 1974

[21] Appl. No.: 528,293

Related U.S. Application Data

[63] Continuation-in-part of Ser. No. 370,113, June 14, 1973, abandoned.

[52] U.S. Cl. .......................... 260/873; 260/18 PF; 260/22 CB; 428/458; 428/482; 428/540; 428/541
[51] Int. Cl.$^2$ ...................................... C08G 39/10
[58] Field of Search ............... 260/873, 75 R, 75 H
[56] References Cited

UNITED STATES PATENTS

| 2,773,851 | 12/1956 | Tolman | 260/873 |
|---|---|---|---|
| 3,011,999 | 12/1961 | Parker et al. | 260/873 |
| 3,574,789 | 4/1971 | Bungs et al. | 260/873 |
| 3,686,361 | 8/1972 | De Witt | 260/873 |

OTHER PUBLICATIONS

Plastics — Glossary Sect. E 1967 p. 310.

Primary Examiner—Theodore E. Pertilla
Attorney, Agent, or Firm—F. W. Brunner; J. M. Wallace, Jr.

[57] ABSTRACT

There is disclosed compatible, homogeneous blends comprised of from 90 to 10 percent by weight, based on the total weight of the blend of an essentially unplasticized polyvinyl chloride having an intrinsic viscosity ranging from 0.6 to 1.0 and from 10 to 90 percent by weight, based on the total weight of the blend, of an essentially noncrystallizable copolyester having an intrinsic viscosity ranging from 0.5 to 1.10 and a softening point ranging from 70° C. to 220° C.

9 Claims, No Drawings

POLYVINYL CHLORIDE/COPOLYESTER COMPOSITIONS

This application is a continuation-in-part of our application Ser. No. 370,113 June 14, 1973 now abandoned.

This invention relates to homogeneous blends of essentially unplasticized polyvinyl chloride and high molecular weight copolyesters. More particularly this invention relates to improved compatible blends of polyvinyl chloride and essentially noncrystallizable high molecular weight copolyesters.

It is well known that rigid polyvinyl chloride (PVC) is relatively brittle, has a relatively low impact resistance and possesses a low flex life, thus rendering it unsuitable for many applications. Furthermore, it is known that rigid polyvinyl chloride is extremely sensitive to high temperatures such as those required in melt extrusion which further limits its uses in fiber, film and extrusion coating application. It is also well known that many noncrystallizable copolyesters possess relatively low softening temperatures and tensile strengths and more importantly they readily undergo hydrolytic degradation when heated in the presence of moisture and are therefore also limited in their field of use.

In order to overcome these drawbacks prior art attempts have been made to combine polyvinyl chloride with polyesters in general into useful blends. However, these attempts have met with only limited success due to the general incompatability of these polymers in combination with each other and due to the ready hydrolysis of the polyester component and the high temperature sensitivity of the polyvinyl chloride component.

It has now been found that compatabile and homogeneous blends of polyvinyl chloride (including certain vinyl acetate and vinylidene chloride copolymers thereof) and a specific class of copolyesters defined below can be prepared which exhibit the desirable properties of the individual components comprising these blends. Accordingly, the present invention consists of compatible, homogeneous blends comprised of from 90 to 10 percent by weight, based on the total weight of the blends, of polyvinyl chloride and from 10 to 90 percent by weight based on the total weight of the blends of an essentially noncrystallizable copolyester derived from dicarboxylic acids selected from the group consisting of aliphatic and aromatic dicarboxylic acids or the lower alkyl (i.e., $C_1 - C_4$) esters thereof and glycols selected from the group consisting of alkylene glycols containing from 2 to 10 carbon atoms and ethers thereof, cycloalkylene glycols, hydroxyalkylene derivatives of bisphenol A and hydroxyalkylene derivatives of diphenols.

The copolyesters useful in preparing the blends constituting the invention can be characterized as being essentially noncrystallizable and possessing softening points ranging from about 70° C. to about 210° C. and preferably between 150° C. and 190° C. The use of essentially noncrystallizable copolyesters having softening points greater than 220° C. is not practical due to the poor thermal stability of polyvinyl chloride above this temperature. The copolyesters are further characterized by having intrinsic viscosities ranging from about 0.50 to 1.10 and preferably from 0.6 to 0.8. The copolyesters useful in the present invention are still further characterized by their good stability against hydrolytic degradation.

The essentially noncrystallizable copolyesters characterized above can be prepared by any one of a number of well known processes available in the polyester art. For example, the copolyesters can be prepared by either the direct esterification-polydondensation process or by the transesterification-polycondensation process. In the former a dicarboxylic acid and glycol are reacted together under elevated temperatures and at a atmospheric or superatmospheric pressures to produce a low molecular weight prepolymer. This prepolymer is then polycondensed under still higher temperatures and reduced pressures and in the presence of a polycondensation catalyst such as antimony trioxide or titanium compounds to produce high molecular weight product. In the latter the transesterification (or ester interchange) reaction is first carried out between a lower alkyl (i.e., $C_1 - C_4$) ester of a dicarboxylic acid and a glycol in the presence of a catalyst, e.g., manganese octanoate, lead acetate, etc., and at elevated temperatures and at atmospheric pressure to produce the corresponding dicarboxylic acid glycol diester and oligomers thereof. The diester and oligomers thereof are then polycondensed under essentially the same conditions as described above for the polycondensation stage in the direct esterification polycondensation process.

Various other materials can also be added to the essentially noncrystallizable copolyesters useful in this invention either during or after their preparation. Such various other materials include the polyester art recognized, oxidative, thermal, hydrolytic and ultraviolet light stabilizers. In addition, pigments, delusterants, chain branching agents and other similar additives may be present in the copolyesters.

Representative examples of the dicarboxylic acids which can be employed in the above processes to prepare the copolyesters useful in the blends of the present invention include aliphatic dicarboxylic acids such as glutaric acid, adipic acid, azelaic acid, sebacic acid and the like and aromatic dicarboxylic acids such as terephthalic acid, isophthalic acid, the 2,6- and 2,7-naphthalic acids, dimer acid, phenylindane dicarboxylic acid and the like. In addition, the lower alkyl (i.e., $C_1 - C_4$) esters of the above acids can be employed. Examples of such esters would include the dimethyl ester of terephthalic acid. Of course it is understood that when a single glycol is employed to prepare the copolyesters useful in this invention two or more of the above described dicarboxylic acids or esters thereof must be used.

Representative examples of the glycols useful in the preparation of the copolyesters employed in the present invention include alkylene glycols containing from 2 to 10 carbon atoms such as ethylene glycol, trimethylene glycol, tetramethylene glycol, pentamethylene glycol, neopentyl glycol, hexamethylene glycol, octamethylene glycol and decamethylene glycol and ethers thereof such as diethylene glycol; cycloalkylene glycols such as cyclohexane dimethanol; hydroxy alkylene derivatives of bisphenol A such as 2,2-bis[4-($\beta$-hydroxyethoxy)phenyl] propane and hydroxyalkylene derivatives of diphenols such as 1,4-bis($\beta$-hydroxyethoxy) biphenyl. Of these glycols the tetramethylene glycol, neopentyl glycol and hexamethylene glycol are the most preferred. Also, it is understood that when a single dicarboxylic acid or lower alkyl ester thereof is employed to prepare the copolyesters, two or more of the above described glycols must be used.

Representative examples of the various essentially noncrystallizable copolyesters which can be derived from the above described dicarboxylic acids, esters thereof and glycols include:

poly(ethylene/neopentyl terephthalate) 70/30 to 40/60
poly(cyclohexane dimethanol terephthalate/isophthalate)15/85 to 55/45
poly(tetramethylene terephthalate/isophthalate) 20/80 to 80/20
poly(tetramethylene terephthalate/sebacate) 90/10 to 40/60
poly(tetramethylene terephthalate/azelate) 40/50 to 90/10
poly(tetramethylene terephthalate/adipate) 40/60 to 90/10
poly(hexamethylene terephthalate/isophthalate) 5/95 to 95/5
poly(hexamethylene terephthalate/sebacate) 50/50 to 95/5
poly(ethylene/hexamethylene terephthalate) 5/95 to 70/30
poly(ethylene/diethylene glycol terephthalate) 40/60 to 70/30
poly(ethylene/neopentyl-terephthalate/sebacate) 40/60 to 80/20 — 60/40 to 80/20
poly(ethylene/neopentyl-terephthalate/azelate) 40/60 to 80/20 — 60/40 to 80/20
poly(ethylene/neopentyl-terephthalate/gluterate) 40/60 to 80/20 — 60/40 to 80/20
poly(ethylene/neopentyl-terephthalate/isophthalate) 40/60 to 80/20 — 50/50 to 70/30
poly(tetramethylene terephthalate/isophthalate/sebacate) 30 to 70/10 — 50/5 to 25
poly(ethylene/hexamethylene-terephthalate/isophthalate) 40/60 to 60/40 — 40/60 to 60/40

The ratios given represent molar change ratios of the various constituents in the copolyester.

The polyvinyl chloride component of the blend of this invention includes both the homopolymer and the 95/5 to 98/2 copolymers of vinyl chloride with vinyl acetate and/or vinylidene chloride. Further, the polyvinyl chloride component is characterized as having an intrinsic viscosity which can range from 0.60 to 1.0 and preferably from 0.65 to 0.80 as measured in cyclohexane at 30° C. For best results it is preferred that the polyvinyl chloride component and the copolyester component to be blended together have similar intrinsic viscosities to avoid drastic decreases in the melt viscosities of the blends. Still further, the polyvinyl chloride component is characterized as being essentially unplsticized and as having good thermal stability, processibility and compatibility with the copolyesters. In addition, the polyvinyl chloride component can contain stabilizing materials such as the mercapto tin type compounds, processing aids such as acrylic resins, lubricants, such as stearic acid, metallic soaps of stearic acid, pigments, esters of montanic acid and mixed esters of fatty acids and montanic acid ester, small amounts of low molecular weight polyalkylynes such as polyethylene hydrocarbon waxes and small amounts of epoxidized soybean or linseed oil.

The blends constituting this invention contain from 10 to 90 percent by weight of the copolyester component and from 90 to 10 percent by weight of the polyvinyl chloride component. Preferably the blends contain from 20 to 80 percent by weight of the copolyester component and from 80 to 20 percent by weight of the polyvinyl chloride component. Particularly satisfactory blends were obtained by mixing together from 20 to 45 and from 55 to 80 percent by weight of the copolyester component and from 80 to 55 and from 45 to 20 percent by weight of the polyvinyl chloride component.

The particular ratio of copolyester to polyvinyl chloride will, of course, be dependent upon the ultimate use for which the blend is intended. However, by way of general guidelines, it has been found that blends useful for adhesion applications should contain from about 80 to 20 percent by weight of the polyvinyl chloride and from 20 to 80 percent by weight of the copolyester. In the preparation of films and mono- and multifilament fibers blends containing from about 60 to 70 percent by weight of the polyvinyl chloride and from about 40 to 30 percent by weight of the copolyester and blends containing from about 40 to 20 percent by weight of polyvinyl chloride and from about 60 to 80 percent of copolyester give the best results. Furthermore, when the blends are employed to produce fibers, films, coatings and molded articles which will be subjected to high temperature environments, it is desirable that the copolyesters used in such blends have softening points ranging from about 100° C. to 220° C. and preferably from 150° C. to 190° C.

The blends constituting this invention possess greater practical utility than either the polyvinyl chloride or the copolyester alone and exhibit improved flame retardency stability and durability. For example, the blends can be employed as coatings on electrical conductors (wires, etc.), paper, metal, wood, plastic film and the like, for powder coating applications, for laminations, as adhesives for bonding various materials together such as leather to leather, for the preparation or bonding of nonwoven materials, extrudates and moldings and, as mentioned earlier, for the preparation of monofilament and multifilament fibers, films, ribbons and tapes.

The compatible blends of the present invention are prepared by mixing together the rigid polyvinyl chloride and a copolyester selected from the special class of copolyesters useful in this invention in a banbury, on a roll mill or by extruder mixing. In addition, the polyvinyl chloride and copolyester may be melt blended by adding polyvinyl chloride resin to molten copolyester. Whichever method of blending is employed, said blending is carried out for only such a time interval that an essentially homogeneous product is obtaind. Prolonged blending is to be avoided because of possible degradation of the polyvinyl chloride.

In the following examples the ratios recited for the blends represent weight ratios of polyvinyl chloride to copolyester in the blend. The ratios recited for the copolyester component represent the molar charge ratio of the various constituents comprising the polyester unless otherwise indicated. The initials I.V. stand for intrinsic viscosity. The I.V. of the copolyesters employed in the following examples was determined in a 60/40 phenol/tetrachloroethane mixed solvent at 30° C.

EXAMPLE 1

A 70/30 polyvinyl chloride (PVC)/copolyester blend was prepared by mixing together in a banbury mixer 2310.0 grams of a commercial grade polyvinyl chloride (I.V. = 0.64) and containing 11 parts by weight of various stabilizers, lubricants and processing aids with 990.0 grams of 70/30 poly(ethylene terephthalate/sebacate) containing a phosphorous stabilizer and having an I.V. of 0.89. The mixing chamber of the banbury unit was preheated to between 250° to 300° F. One half (or 1155 grams) of the PVC component was then added to the banbury followed by addition of the copolyester component and the remainder of the PVC component. The mixture reached a temperature of 300° F. in approximately 2.5 minutes. Mixing was continued for an additional 5 minutes. The blend was then discharged from the banbury and milled into sheets on a two roll (8 inch) mill at a temperature of approximately 240° to 350° F. The sheeted blends were then ground to pass a one-fourth inch screen, thoroughly dried and extruded into fiber. The extruded fibers exhibited a tenacity of 3.53 grams per denier, a tensile of 14.31 pounds and an elongation of 3.6 percent. These PVC/copolyester fibers were used to bond untextured knit fabric samples of poly(ethylene terephthalate) by heating for 3 minutes at 325° F. and one Torr pressure.

EXAMPLE 2

A 70/30 polyvinyl chloride/copolyester blend was prepared in the same manner as described in Example 1 except that the 70/30 poly(ethylene terephthalate/sebacate) component was replaced with a 70/30 poly(ethylene/neopentyl terephthalate) copolyester having an I.V. of 0.65 and the total mixing time was approximately 5 minutes. The extruded monofilament fiber of this blend possessed a tenacity of 3.61 grams/denier, a tensile of 21.1 pounds and an elongation of 2.9 percent. It was used to successfully bond polyethylene terephthalate knitted fabrics.

EXAMPLE 3

A 70/30 blend of polyvinyl chloride/copolyester was prepared in a manner similar to Example 1 except that a 50/50 poly(tetramethylene terephthalate/isophthalate) copolyester having an intrinsic viscosity of 0.65 was employed as the copolyester compound of the blend. Total mixing time for preparing the blend was approximately 6 minutes. Again the blend was extruded into fiber which exhibited a tenacity of 3.93 grams/denier, a tensile of 19.4 pounds and an elongation of 3.0 percent. The resulting fibers have good stability to hydrolytic degradation which makes the fibers and resulting fabrics particularly useful in outdoor applications such as window screens, outdoor furniture, carpeting, etc.

EXAMPLE 4

Two further 70/30 blends were prepared according to the procedure of Example 1. The first blend, designated as Blend A, contained as the copolyester component an 80/20 poly(hexamethylene terephthalate/isophthalate) copolyester having an I.V. of 0.62. The time required to obtain a homogeneous blend was approximately 6 minutes. The extruded fiber obtained from the blend exhibited a tenacity of 2.58 grams per denier, a tensile of 22.7 pounds and an elongation of 4.0 percent. These fibers were used to bond polyethylene terephthalate fabrics.

The second blend, designed as Blend B, contained as the polyester component a 70/30 poly(ethylene/neopentyl-[45/45/10] terephthalate/isophthalate/sebacate) copolyester having an I.V. of 0.74. The time required to obtain the homogeneous blend was about 6 minutes. Fiber extruded from this blend exhibited a tenacity of 4.73 grams per denier, a tensile of 19.3 pounds and an elongation of 3.1 percent. Polyethylene terephthalate fibers could be bonded readily by using this PVC/copolyester blend fiber.

EXAMPLE 5

A blend containing 30 percent by weight of polyvinyl chloride and 70 percent by weight of 70/10/20 poly(tetramethylene terephthalate/isophthalate/sebacate) having an intrinsic viscosity of 0.80 and containing 1.0 percent by weight of Agerite Geltrol, a hindered phenolic phosphite sold by Vanderbilt Company, was prepared on a two roll mill at a mill temperature of about 180° C. The resulting homogeneous blend was cooled, ground and dried and then melt extruded into a monofilament of 450 denier. The filament exhibited a tensile strength of 1.4 grams per denier, 30 percent elongation and 28 percent shrinkage.

EXAMPLE 6

Two polyvinyl chloride/copolyester blends were prepared as described in Example 5, except that the copolyester component employed consisted of a 30/70 poly(hexamethylene terephthalate/isophthalate) [HMT/I] copolyester having an intrinsic viscosity of 0.78 and the polyvinyl chloride and copolyester components were blended at a mill temperature of 155° C. The blends were extruded into films and fibers and the properties of these shaped articles are given in the table below.

TABLE I

| | Weight Percent | Weight Percent |
|---|---|---|
| Polyvinyl chloride | 5 | 10 |
| HMT/I | 95 | 90 |
| Heat distortion Temp., ° F. | 147 | 144 |
| Izod Impact (Ft-lb/in) | | |
| Unaged | 0.5 | 0.5 |
| Aged 500 hrs. (Fade-Ometer) | 0.6 | 0.5 |
| Tensile strength, psi | 8000 | 7100 |
| Percent elongation | 1.3 | 1.0 |
| Flexural strength | | |
| Unaged | 12,140 | 13,000 |
| Aged 500 hrs. (Fade-Ometer) | 16,410 | 16,260 |
| Flexular modulus | | |
| Unaged | 333,000 | 384,000 |
| Aged 500 hrs. (Fade-Ometer) | 340,000 | 380,000 |
| Percent shrinkage (film) | | |
| 24 hrs. at 175° F. | 1.20 | 1.09 |

The above data illustrate that these blends, which are representative of the compositions of this invention, retain their excellent flexural and modulus characteristics even after prolonged aging.

EXAMPLE 7

Compatible blends of polyvinyl chloride with a 40/40/20 molar ratio poly(tetramethylene terephthalate/isophthalate/sebacate) copolyester having an intrinsic viscosity of 0.75 and containing 2 percent by weight of a stabilizer comprised of 60 parts by weight of a hindered phenolic phosphite and 40 parts by weight of alkylated phenolic compounds were prepared in PVC/copolyester weight percent ratios of 70/30 and 30/70. These blends exhibited improved adhesion to various substrates over polyvinyl chloride alone.

EXAMPLE 8

Seven blends of polyvinyl chloride and various copolyesters and which contained varying polyvinyl chloride/copolyester ratios were prepared and extruded into film to test their dielectric strength and resistance to dielectric strength loss when aged for 24 hours in distilled water. In Table IIA below, which sets forth the parts by weight of the components making up the seven blends, ET/S stands for 70/30 poly(ethylene terephthalate/sebacate) copolyester, E/N-T/S stands for 55/45 (bound ratio) — 80/20 poly(ethylene/neopentyl-terephthalate/sebacate) copolyester and E/N-T/I stands for 50/50 — 50/50 poly(ethylene/neopentyl-terephthalate/isophthalate) copolyester. Table II B contains the dielectric strengths determined for the blends listed in Table IIA before and after aging and additionally sets forth the percentage decrease, if any, in dielectric strength as a result of said described aging.

TABLE IIA

| Blend | PVC | Et/S | E/N - T/S | E/N - T/I |
|---|---|---|---|---|
| A | 100 | 100 | — | — |
| B | 100 | 75 | — | — |
| C | 100 | 50 | — | — |
| D | 100 | — | 50 | — |
| E | 100 | — | — | 50 |

TABLE IIB

| | Dielectric Strength[1] | | % Loss in |
|---|---|---|---|
| Blend | Volts/Mil Dry | Volts/Mil West | Dielectric Strength |
| A | 1898 | 1898 | 0.0 |
| B | 2040 | 1985 | 2.7 |
| C | 2380 | 2242 | 5.8 |
| D | 2073 | 2022 | 2.6 |
| E | 1640 | 1625 | 0.9 |
| PVC[2] | 1614 | 1548 | 4.1 |
| ET/S[3] | 1608 | 1469 | 8.6 |

[1]Dielectric strength is defined as the ratio of the dielectric breakdown voltage of the test sample (volts) to the thickness of the test sample (mils). Dielectric breakdown voltage is the voltage at which electrical breakdown of the test specimen occurs.
[2]Control for comparison purposes.
[3]Control for comparison purposes.

The data in Table IIB demonstrate that the blends possess higher dielectric strengths than either the PVC or copolyester components alone. These data further illustrate that specifically the blends more readily retain their dielectric strengths upon aging than the copolyester alone and in general more so than PVC as well.

EXAMPLE 9

Several compatible polyvinyl chloride/copolyester blends were prepared and evaluated for flame resistance. Table IIIB below contains the results of this evaluation. Therein is set forth the time of burning of the test specimens after removal of the igniting flame and the classification of the test specimen as either nonburning (NB) or self-extinguishing (SE), depending on its post-ignition burning time. The test method employed was that described in ASTM D568—56T. The polyvinyl chloride component employed in preparing these blends contained 8.0 parts per 100 parts PVC of dibasic lead phosphate, 5.0 parts per 100 parts PVC of antimony trioxide and 1.0 part per 100 parts PVC of a low molecular weight PVC. The copolyesters employed include a 70/30 poly(ethylene terephthalate/sebacate) copolyester [ET/S], a 55/45 (bound ratio) — 80/20 poly(ethylene/neopentyl-terephthalate/sebacate) copolyester [E/N — T/S], a 50/50 - 50/50 poly(ethylene/neopentyl-terephthalate/isophthalate) copolyester [E/N - T/I] and a 50/50 poly(ethylene/neopentyl terephthalate) copolyester [E/NT]. Table IIIA below sets forth, in parts by weight, the amounts of PVC and copolyester in each of the blends prepared.

TABLE IIIA

| Blend | PVC | ET/S | E/N - T/S | E/N - T/I | E/NT |
|---|---|---|---|---|---|
| A | 100 | 100 | — | — | — |
| B | 100 | 75 | — | — | — |
| C | 100 | 50 | — | — | — |
| D | 100 | 25 | — | — | — |
| E | 100 | — | 100 | — | — |
| F | 100 | — | 75 | — | — |
| G | 100 | — | 50 | — | — |
| H | 100 | — | — | 50 | — |
| I | 100 | — | — | — | 50 |

TABLE IIIB

| FLAME RESISTANCE (ASTM D568-56T) | | |
|---|---|---|
| Blend | Time (Sec.) | Classification |
| A | 17 | SE |
| B | 16 | SE |
| C | 14 | NB |
| D | 11 | NB |
| E | 40 | SE |
| F | 34 | SE |
| G | 17 | SE |
| H | 37 | SE |
| I | 9 | SE |
| 70/30 ET/S[1] | — | — |

[1]Control for comparison purposes - completely burned.

The above data illustrate the excellent flame resistance of certain blends of this invention. In addition, these blends are useful as fibers, adhesives, moldings, coatings, for seaming of fabrics and for lamination applications.

EXAMPLE 10

A series of blends consisting of polyvinyl chloride (PVC) and 70/30 poly(ethylene terephthalate/sebacate) copolyester [ET/S] was prepared and processed into film to compare the physical properties of these blends against the physical properties of the individual components of the blends. Table IV below contains the data obtained from this comparison. From this data it can be seen that the blends exhibit both improved tensile strength and improved elongation. The yield point, as set forth in the Table, is that point on the stress-strain curve at which an increase in strain occurs without an increase in stress.

TBALE IV

| | Weight Percent | Yield Point | | Break Point | | Gauge |
|---|---|---|---|---|---|---|
| Blend | Ratio | PSI | Percent Elongation | PSI | Percent Elongation | Mils |
| 1 | 50/50 | 4901 | 22 | 6362 | 113 | 5.8 |
| 2 | 57/43 | — | — | 5913 | 80 | 4.6 |
| 3 | 67/33 | 6378 | 21 | 8486 | 81 | 3.7 |
| 4 | 80/20 | 6500 | 48 | 6913 | 48 | 4.6 |
| 5[a] | — | — | — | 3437 | 703 | 7.1 |
| 6[b] | — | — | — | 3732 | 16 | 4.1 |

[a]Control: 70/30 ET/S
[b]Control: PVC

While certain representative embodiments and details have been shown for the purpose of illustrating the invention it will be apparent to those skilled in this art that various changes and modifications may be made therein without departing from the spirit of scope of the invention.

We claim:

1. Compatible and homogeneous blends comprised of (A) from 90 to 10 percent by weight, based on the total weight of the blend, of an essentially unplasticized polyvinyl chloride having an intrinsic viscosity ranging from 0.60 to 1.0 as measured in cyclohexane at 30° C. and (B) from 10 to 90 percent by weight, based on the total weight of the blend, of an essentially noncrystallizable copolyester having an intrinsic viscosity ranging from 0.50 to 1.10 and a softening point ranging from 70° C. to 220° C., said copolyesters being prepared from the reaction of dicarboxylic acids selected from the group consisting of aliphatic and aromatic dicarboxylic acids or the lower alkyl esters thereof with glycols selected from the group consisting of alkylene glycols containing from 2 to 10 carbon atoms and ethers thereof, cycloalkylene glycols, hydroxyalkylene derivatives of bisphenol A and hydroxy alkylene derivatives of diphenols.

2. The blends of claim 1 wherein the essentially unplasticized polyvinyl chloride polymer has an intrinsic viscosity ranging from 0.65 to 0.80 and the essentially noncrystallizable copolyester has an intrinsic viscosity ranging from 0.60 to 0.80 and wherein said copolyester has a softening point ranging from 150° C. to 190° C.

3. The blends of claim 1 wherein the polyvinyl chloride polymer comprises from 80 to 55 percent by weight, based on the total weight of the blend, and the copolyester comprises from 20 to 45 percent by weight, based on the total weight of the blend.

4. The blends of claim 1 wherein the polyvinyl chloride polymer comprises from 45 to 20 percent by weight, based on the total weight of the blend, and the copolyester comprises from 55 to 80 percent by weight based on the total weight of the blend.

5. The compatible and homogeneous blends of claim 1 wherein the essentially noncrystallizable copolyester is selected from the group consisting of poly(ethylene terephthalate/sebacate), poly(tetramethylene terephthalate/isophthalate), poly(hexamethylene terephthalate/isophthalate), poly(ethylene/neopentyl terephthalate), poly(tetramethylene terephthalate/isophthalate/sebacate), poly(ethylene/neopentyl-terephthalate/sebacate), poly(ethylene/neopentyl-terephthalate/isophthalate) and poly(ethylene/neopentyl-terephthalate/isophthalate/sebacate).

6. The blends of claim 1 in the form of an oriented fiber.

7. The blends of claim 1 in the form of a molded article.

8. The blends of claim 1 in the form of an adhesive.

9. The blends of claim 1 in the form of film, ribbon and tape.

* * * * *

UNITED STATES PATENT OFFICE
CERTIFICATE OF CORRECTION

PATENT NO. : 4,010,221
DATED : March 1, 1977
INVENTOR(S) : Charles J. Gebhart, Clyde E. Gleim & Maria V. Wiener It is certified that error appears in the above-identified patent and that said Letters Patent are hereby corrected as shown below:

In Column 2, Line 8, "polydondensation" should be

--polycondensation--.

In Column 2, Line 64, after word "1,4-bis(β-hydroxyethoxy)"

should be -- benzene and 4,4'-bis(β-hydroxyethoxy)--.

Signed and Sealed this

Eighteenth Day of March 1980

[SEAL]

Attest:

SIDNEY A. DIAMOND

Attesting Officer  Commissioner of Patents and Trademarks